United States Patent
Kaplan

(10) Patent No.: US 9,037,872 B2
(45) Date of Patent: May 19, 2015

(54) HARDWARE BASED RETURN POINTER ENCRYPTION

(71) Applicant: Advanced Micro Devices, Inc., Sunnyvale, CA (US)

(72) Inventor: David A. Kaplan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/717,315

(22) Filed: Dec. 17, 2012

(65) Prior Publication Data

US 2014/0173293 A1    Jun. 19, 2014

(51) Int. Cl.
*G06F 21/00* (2013.01)
*G06F 21/54* (2013.01)

(52) U.S. Cl.
CPC ....................................... *G06F 21/54* (2013.01)

(58) Field of Classification Search
CPC ..... G06F 12/1408; G06F 21/72; G06F 21/14; G06F 21/123; G06F 21/125
USPC ....................... 713/193, 187; 726/22
See application file for complete search history.

(56) References Cited

U.S. PATENT DOCUMENTS

| 6,202,152 | B1 * | 3/2001 | Yuenyongsgool et al. ... 713/189 |
| 6,385,727 | B1 * | 5/2002 | Cassagnol et al. ............ 713/193 |
| 7,086,088 | B2 * | 8/2006 | Narayanan ...................... 726/22 |
| 7,581,089 | B1 * | 8/2009 | White ............................. 712/242 |
| 7,752,459 | B2 * | 7/2010 | Cowan et al. ................. 713/190 |
| 8,281,154 | B2 * | 10/2012 | Donie et al. ................... 713/190 |
| 8,397,082 | B2 * | 3/2013 | Milliken ......................... 713/190 |

* cited by examiner

*Primary Examiner* — Amare F Tabor
(74) *Attorney, Agent, or Firm* — Volpe and Koenig, P.C.

(57) ABSTRACT

A processor, a method and a computer-readable storage medium for encrypting a return address are provided. The processor comprises hardware logic configured to encrypt an instruction pointer and push the encrypted instruction pointer onto a stack. The logic is further configured to retrieve the encrypted instruction pointer from the stack, decrypt the instruction pointer and redirect execution to the decrypted instruction pointer.

21 Claims, 20 Drawing Sheets

HARDWARE BASED RETURN POINTER ENCRYPTION

BACKGROUND OF EMBODIMENTS

1. Field

The embodiments are generally directed to semiconductor devices, and more specifically to microprocessors.

2. Background Art

Buffer overflow attacks represent a substantial security threat for many computer systems. During a buffer overflow attack, a user of a computer application exploits certain vulnerabilities in the code which allows the user to insert data into the call stack region of memory. By injecting data into the stack, the user can cause the computer to execute code that compromises the operation of the system and the security of its data. Some approaches to prevent stack buffer overflow attacks involve compilation techniques or other software based methods. However, these methods may add significant overhead to the performance of software and may require recompilation of existing code.

BRIEF SUMMARY OF EMBODIMENTS

There is a need for approaches to prevent buffer overflow attacks which minimize performance overhead and do not require recompilation of existing code.

A processor, a method and a computer-readable storage medium for encrypting a return address are provided. The processor comprises hardware logic configured to encrypt an instruction pointer and store the encrypted instruction pointer onto a stack. The logic is further configured to retrieve the encrypted instruction pointer from the stack, decrypt the instruction pointer and redirect execution to the decrypted instruction pointer.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the relevant art(s) to make and use the embodiments.

Figure 1:
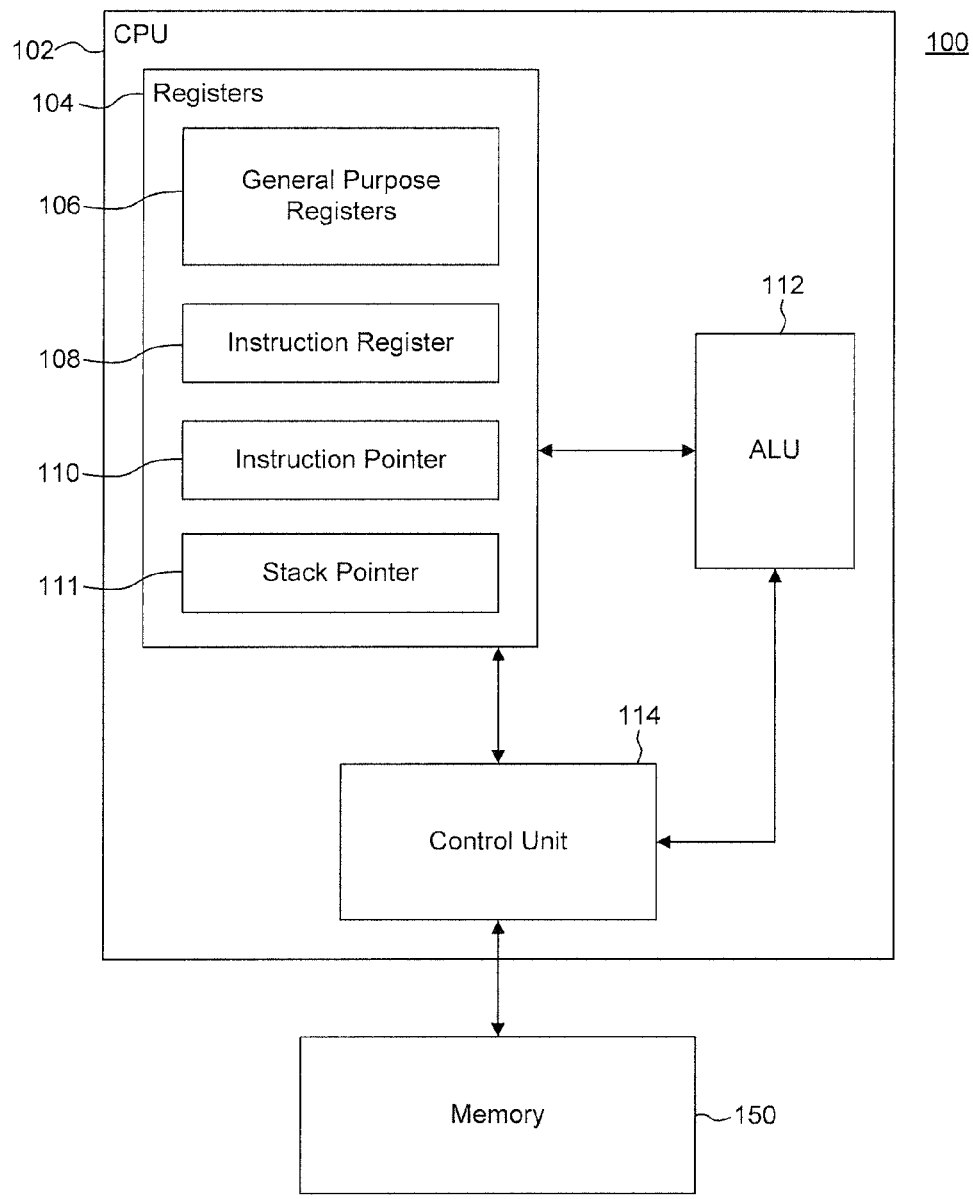
FIG. 1 is a system diagram of a computer processor operating environment, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural fauns as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Overview

FIG. 1 is a block diagram of an illustrative computer processor operating environment 100, according to an embodiment. In one example, operating environment 100 includes a central processing unit (CPU) 102 and a memory unit 150.

In one example, CPU 102 is a piece of hardware within a computing device which carries out instructions executing computer programs or applications. CPU 102 carries out instructions by performing arithmetical, logical and input/output operations specified by computer programs or applications. In an embodiment, CPU 102 performs control instructions that include decision making code of a computer program or an application.

In one example, memory 150 is a piece of hardware which stores and loads data in response to electronic signals carrying instructions. Memory 150 may be volatile and non-volatile memory. Examples of volatile memory include a random access memory (RAM). Volatile memory typically stores data as long as the electronic device receives power. Examples of non-volatile memory include read-only memory, flash memory, ferroelectric RAM (F-RAM), hard disks, floppy disks, magnetic tape, optical discs, etc. Non-volatile memory retains its memory state when the electronic device loses power or is turned off. In an embodiment, memory 150 can be cache memory contained within CPU 102. Cache memory is a smaller and faster memory that stores copies of data from recently accessed memory locations from main memory. In an embodiment, processor 102 reads data from and writes data to memory 150 as part of program or application execution.

In one example, CPU 102 includes a set of registers 104, an arithmetic logic unit (ALU) 112 and a control unit 114. In this example, the set of registers 104 includes general purpose registers 106, instruction register 108, instruction pointer 110 and stack pointer 111.

In one example, instruction pointer 110 contains the address of the next instruction to be executed by the CPU. In an embodiment, the normal processor instruction cycle involves the control unit 114 reading an address from instruction pointer 110, fetching an instruction from the address in memory 150, and storing the instruction in instruction register 108. After an instruction is fetched, the value in the instruction pointer 110 is automatically increased to point to the next instruction in memory. Control unit 114 then executes the instruction in instruction register 108 and proceeds to fetch the next instruction pointed by instruction pointer 110.

In one example, stack pointer 111 contains the address of the call stack. A stack is a data structure which contains elements that are added and removed in a last in, first out (LIFO) fashion. When an element is added on the stack, it is said that the element is "pushed" to the top of the stack. When an element is removed from the stack it is said the element is "popped" from the top of the stack. A stack can be implemented by maintaining an address to the top element of the stack, called a stack pointer, in a CPU register. As elements in the stack pushed or popped, the value of the stack pointer is adjusted accordingly. In an embodiment, the memory address to which each subroutine should return control when it finishes executing is stored on a call stack.

Figure 2:
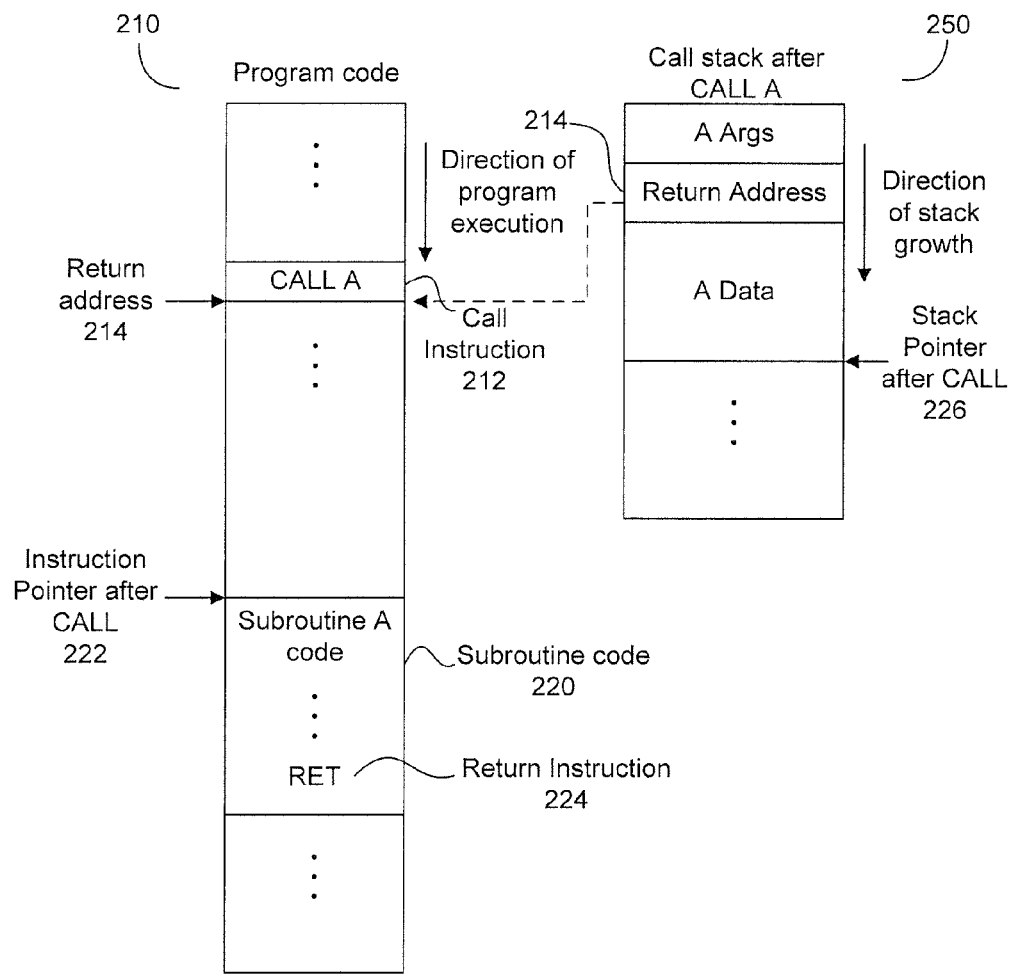
FIG. 2 is a diagram of memory contents of a computer system during an illustrative normal execution of a program code, according to an embodiment.

FIG. 2 depicts memory contents 200 of a computer system during an illustrative normal execution of a program code by a processor. In this example, the memory contents include a region of memory 210 containing program code and a region of memory 250 containing a call stack.

In one example, program code region 210 contains instructions that are to be executed by processor 102. In an embodiment, program code 210 contains subroutine A code 220, which executes subroutine A and which is stored in subroutine A start address 222.

In one example, call stack region 250 stores a stack data structure containing information regarding the subroutines of a computer program. Stack 250 keeps track of the memory address to which each subroutine should return control when it finishes executing. Stack pointer register 111 stores stack pointer 226 which points to the latest element added to stack 250 (also known as the "top" of the stack), and enables the CPU to access the data in the stack.

In an embodiment, program code region 210 contains call instruction 212, which calls subroutine A. With reference to FIG. 1, when call instruction 212 is executed, control unit 114 stores the start address 222 of subroutine A into instruction pointer 110. Consequently, the CPU will begin execution of subroutine A code 220. In addition, when call instruction 212 is executed, return address 214 will be pushed onto call stack 250, along with arguments and other data necessary for execution of subroutine A code 220. Pushing data into the call stack comprises storing the data into call stack region 250 and updating the address in stack pointer 111 to point to the top of the call stack.

Subroutine A ends when return instruction 224 is executed, at which point the control unit 114 uses stack pointer 226 to calculate return address 214 from stack 250 and place return address 214 into instruction pointer 110, causing the CPU to continue execution of program code 210 at address 214.

Figure 3:
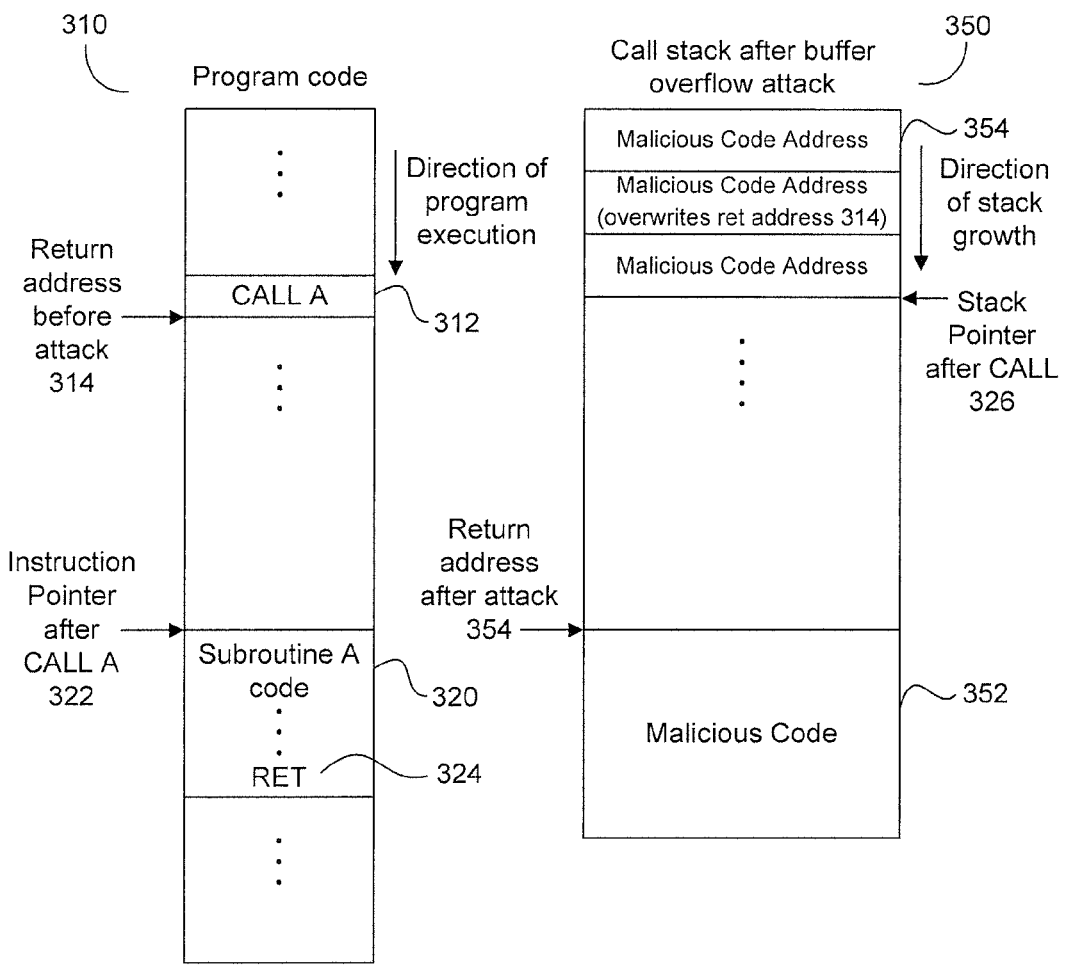
FIG. 3 is a diagram of memory contents of a computer system during an illustrative execution of a program code under a buffer overflow attack, according to an embodiment.

FIG. 3 depicts memory contents 300 of a computer system during an illustrative execution of a program code by a processor under a stack buffer overflow attack. In this example, the memory contents include a region of memory 310 containing program code and a region of memory 350 containing a call stack.

In one example, program code region 310 contains instructions that are to be executed by processor 102 (FIG. 1). In an embodiment, program code 310 contains a subroutine A code 320, which is stored in subroutine start address 322. Program code region 310 contains call instruction 312, which calls subroutine A.

In one example, call stack region 350 contains a stack data structure that has been overwritten by a stack overflow attack. In an embodiment, a stack overflow attack is a type of buffer overflow attack which involves a user of a computer program overwriting data in a call stack 350 in order to change the return address of a subroutine. Call stack data can be overwritten in numerous ways, as will be understood by those skilled in the relevant arts. In an embodiment, a malicious user exploits a vulnerability in the software code to inject malicious code into the system's memory.

In this example, overwritten call stack region 350 contains a malicious code 352 and a malicious code start address 354.

Malicious code 352 can be any code. In an embodiment, malicious code 352 may be a virus, worm, trojan horse, malware, etc. as will be recognized by those skilled in the relevant arts. For example, it could be code that allows a malicious user to gain control over the computer system. Although in the present embodiment malicious code 352 is stored in the call stack, it should be understood that malicious code 352 could be any code stored in any region of memory. Those skilled in the art will recognize numerous possible attacks.

In an embodiment, with reference to FIGS. 1 and 3, a stack overflow attack overwrites the original return address 314, which pointed to the instruction after call instruction 312, with malicious code start address 354. As a result, when subroutine A returns, control unit 114 will retrieve the malicious code return address 354 and place it into instruction pointer 110, causing the execution of malicious code 352.

Return Address Encryption

Figure 4:
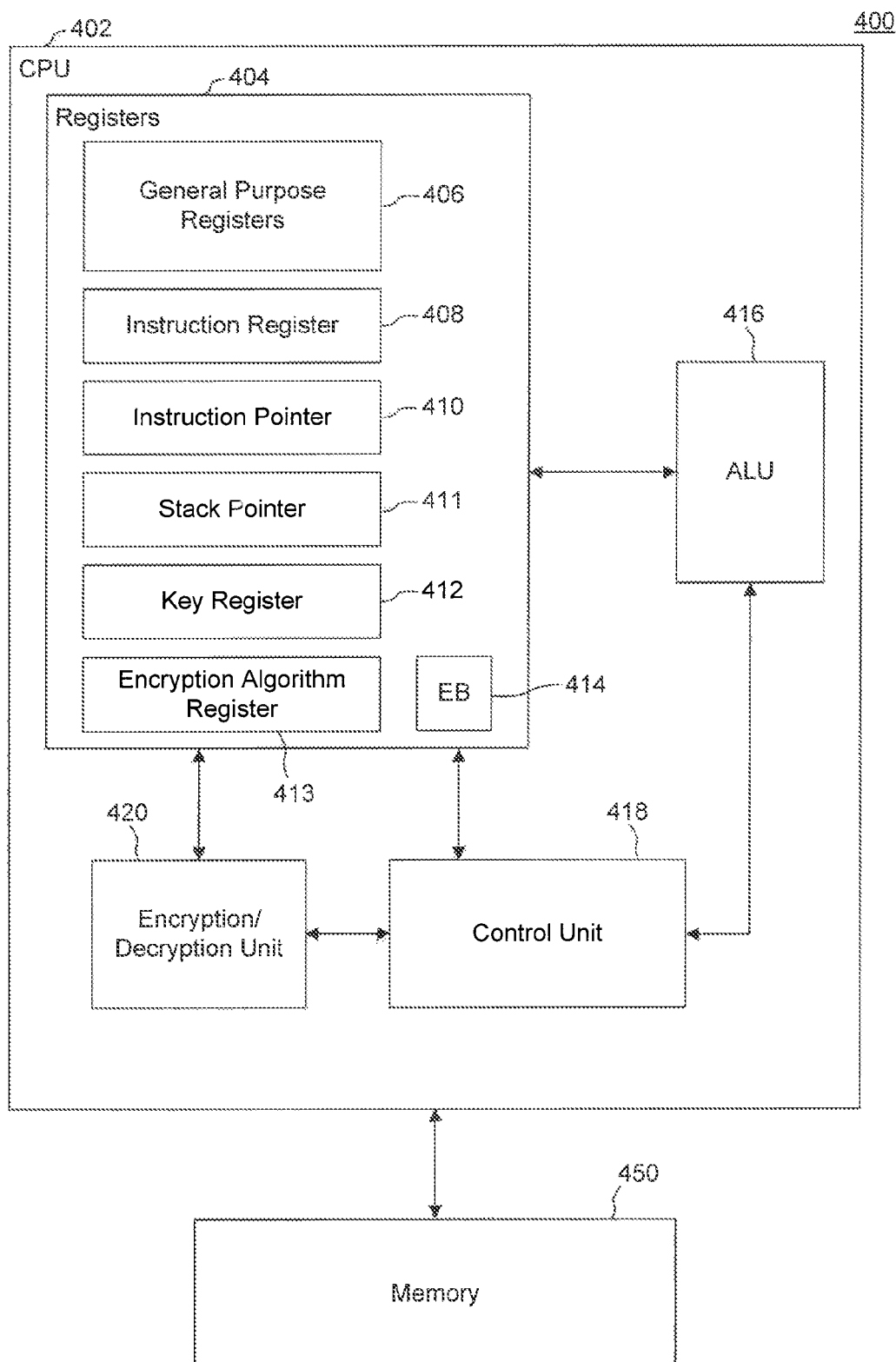
FIG. 4 is a system diagram of computer processor operating environment configured to impede stack overflow attacks, according to an embodiment.

FIG. 4 is a block diagram of an illustrative computer processor operating environment 400 configured to impede stack overflow attacks, according to an embodiment. In one example, operating environment 400 includes a central processing unit (CPU) 402 and a memory unit 450.

In an embodiment, CPU 402 includes a set of registers 404, an arithmetic logic unit (ALU) 416, a control unit 418 and an encryption/decryption unit 420. In an embodiment, the set of registers 404 includes general purpose registers 406, instruction register 408, instruction pointer 410, key register 412, encryption algorithm register 413 and enable bit 414.

In an embodiment, memory 450 can be cache memory contained within CPU 402.

In one example, encryption/decryption unit 420 performs encryption and decryption of the return address of a subroutine, as further explained below with reference to FIGS. 5 and 6. Encryption/decryption unit 420 may comprise logic circuitry configured to perform encryption and decryption operations as described herein. In certain embodiments, encryption/decryption unit 420 may be located within other components of CPU 402, such as ALU 416. It will be understood by those skilled in the relevant arts that hardware logic to perform the steps in methods 500 and 600 can be included in other sections of the CPU. In an example, encryption/decryption operations may be implemented in microcode which implements instructions, as will be further explained herein.

In one example, key register 412 may be used by CPU 402 to store an encryption key to be used in encryption and decryption operations. Encryption algorithm register 413 may be used by CPU 402 to store a value that indicates which of various encryption algorithms encryption/decryption unit 420 will employ. Enable bit 414 may be used by CPU 402 to indicate whether encryption should or should not be performed. In an embodiment, CPU 402 may not include key register 412, encryption algorithm register 413 or enable bit 414, and their functionality may be implemented in other registers or regions of memory as will be understood by those skilled in the relevant arts. The functionality of key register 412, encryption algorithm register 413 or enable bit 414 may be implemented in hardware, software or any combination thereof.

Figure 5:
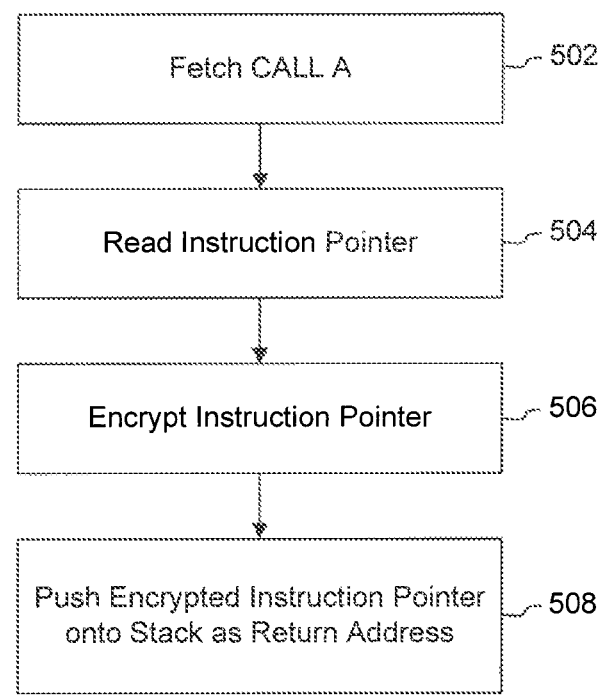
FIG. 5 is a flowchart depicting an encryption operation performed by a processor in order to impede stack overflow attacks, according to an embodiment.

FIG. 5 presents a flowchart depicting a method 500 in accordance with an embodiment. In one example method 500 is an encryption operation performed by CPU 402 (FIG. 4) in order to impede stack overflow attacks. It is to be appreciated that not all operations need be performed, or be performed in the order shown. An exemplary embodiment is discussed below, in which method 500 is performed by the system shown in FIG. 4. This is a non-limiting example.

At step 502, CPU 402 fetches from instruction register 408 (FIG. 4), which in this example contains a call instruction directing CPU 402 to execute subroutine A. It should be understood that step 502 could comprise fetching a different type of instruction, depending on the architecture of CPU 402. For example, in an ARM architecture, step 502 may comprise fetching a branch link instruction.

At step 504, CPU 402 reads the instruction pointer register 410 (FIG. 4). This value is used as the return address from the call instruction, and corresponds to the memory location from which the CPU will fetch after a return from subroutine A.

At step 506, encryption/decryption unit 420 encrypts the return address. The return address is encrypted using a secret key stored in the CPU hardware, for example, in key register 412 (FIG. 4).

At step 508, CPU 402 pushes the encrypted return address onto the call stack as the return address of subroutine A.

At this point in method 500, CPU 402 can then proceed with the rest of the steps of a call instruction as otherwise explained herein and as will be understood by those skilled in the relevant arts. Although presented as separate steps, the steps of flowchart 500 can occur simultaneously or in a different order than illustrated here.

Figure 6:
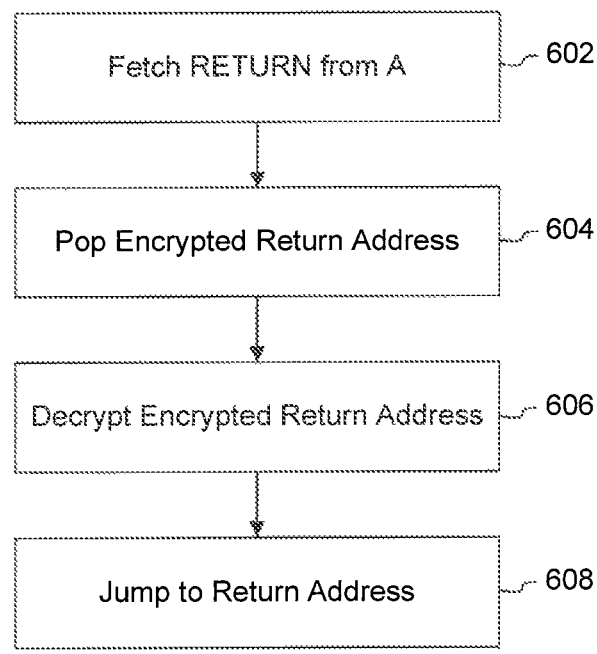
FIG. 6 is a flowchart depicting a decryption operation performed by a processor in order to impede stack overflow attacks, according to an embodiment.

FIG. 6 shows a flowchart depicting a method 600 in accordance with an embodiment. For example, method 600 is a decryption operation performed by CPU 402 (FIG. 4) in order to impede stack overflow attacks. It is to be appreciated that not all operations need be performed, or be performed in the order shown. An exemplary embodiment is discussed below, in which method 600 is performed by the system shown in FIG. 4. This is a non-limiting example.

At step 602, CPU 402 fetches from instruction register 408 (FIG. 4), which in this example contains a return instruction directing CPU 402 to return from subroutine A.

At step 604, CPU 402 pops the encrypted return address from the call stack.

At step 606, encryption/decryption unit 420 decrypts the return address using the secret key.

At step 608, CPU 402 continues execution at the return address, proceeding with the rest of the steps of a return instruction as otherwise explained herein and as will be understood by those skilled in the relevant arts.

Methods 500 and 600 serve as a protection mechanism against buffer overflow attacks. At step 606 of FIG. 6, CPU 402 will apply the decryption algorithm to the return address. If an attacker has overwritten the encrypted return address in the stack with an unencrypted address to a malicious code, this decryption operation will yield an unintended address. Because the attacker does not know the key used to encrypt the return address, the attacker will be unable to reliably redirect program execution to a desired address. At step 608 of FIG. 6, the CPU would then redirect execution to the unintended address in memory. Attempting to execute the contents of an unintended memory location as an instruction would likely cause an error. For example, in a 64-bit mode operating system, it is likely the system will issue a general protection fault, since there is a high probability that the address will not be a valid address. An attacker wanting to reliably redirect execution would need to know the encryption key in order to overwrite a return address with the encrypted value of the address of a malicious code.

The encryption and decryption of the return address can be performed in numerous ways as explained in the following paragraphs, and as will be understood by those skilled in the relevant arts. In an embodiment, CPU 402 can provide various encryption algorithms that can be selected by setting a value in encryption algorithm register 413.

In an embodiment, encryption/decryption unit 420 uses a bijective mapping operation to encrypt and decrypt a return address. For example, encryption/decryption unit 420 can perform a bitwise XOR of the return address and the key as the encryption algorithm. In a different embodiment, encryption/decryption unit 420 performs an XOR of the return address and the key, followed by a left-rotate operation using some bits of the key. In an embodiment, the value of the stack pointer could be used as part of the algorithm. In an embodiment, encryption/decryption unit 420 may use an advanced encryption algorithm such as, for example, Advanced Encryption Standard (AES).

In an embodiment, the encryption algorithm may be chosen based on considerations specific to a particular implementation, taking into account the tradeoffs of the several algorithms with regards to complexity, security and performance. For example, a system in which security is a very high priority and performance is a low priority might be configured to use AES encryption, while a system with high performance requirements might choose an XOR operation. In an embodiment, the encryption algorithm used could be selected depending on a value, or part of a value, of the stack pointer.

In an embodiment, CPU 402 can be configured to not perform the encryption and decryption operations described with reference to FIGS. 5 and 6 by deactivating this feature. In an embodiment, the encryption/decryption feature is deactivated when enable bit 414 is set to a particular value. In an embodiment, the encryption/decryption feature is deactivated when the key is set to a particular value. For example, if the encryption algorithm is an XOR of the return address and the key, the encryption/decryption will be deactivated if the key is set to 0, since the XOR will not change the value of the return address.

In an embodiment, the operating system activates or deactivates the encryption/decryption feature of CPU 402 by, for example, setting or clearing enable bit 414. In an embodiment, the encryption/decryption feature is automatically activated and deactivated based on a processor state. For example, the feature may be activated based on the privilege of the current mode of operation.

In an embodiment, methods 500 and 600 are performed by hardware logic circuitry, by microcode triggered in response to higher level machine code instructions (e.g., call and return instructions), or by some combination of both as will be understood by those skilled in the relevant arts. Microcode is a low level programmable code, typically contained in read-only memory, which comprises micro-instructions used to implement higher level machine code instructions. For example, a call instruction might be implemented in microcode that performs the micro-instructions: 1) read instruction pointer, 2) encrypt instruction pointer, 3) push instruction pointer onto stack and 4) jump to destination address. A return instruction might be implemented in microcode that performs the micro-instructions: 1) pop top of stack, 2) decrypt instruction pointer and 3) jump to instruction pointer.

In an embodiment, the return address is encrypted and decrypted using symmetric encryption with a single key. The key can be stored in key register 412. In one example, the key is accessible to privileged code such as, for example, the operating system. In one example, the key is inaccessible to non-privileged code. In an embodiment, key register 412 is a model-specific register (MSR) that can only be accessed by privileged instructions, as will be understood by those skilled in the relevant arts.

In an embodiment, an operating system running in computer system 400 runs multiple processes. Every process shares the CPU by running for an amount of time and then yielding execution to another process. When a process yields the CPU to another process, its state must be preserved to enable restoring the process to its previous point of execution. The state of a process includes the value of registers, including pointers to the call stack for the subroutines that run within the process. The state of every process is saved when yielding the CPU, and is restored before execution of the process resumes. In an embodiment, the encryption key is process-specific and part of the process state. For example, every process running in a system may use a different key to encrypt the return addresses of its subroutines. In an embodiment, when the operating system initiates a new process, the operating system determines an encryption key for the new process and writes it to key register 412 before running the process. When switching processes, the operating system stores the encryption key as part of the state of the yielding process, and writes the encryption key of the new process before running the process.

Figure 7:
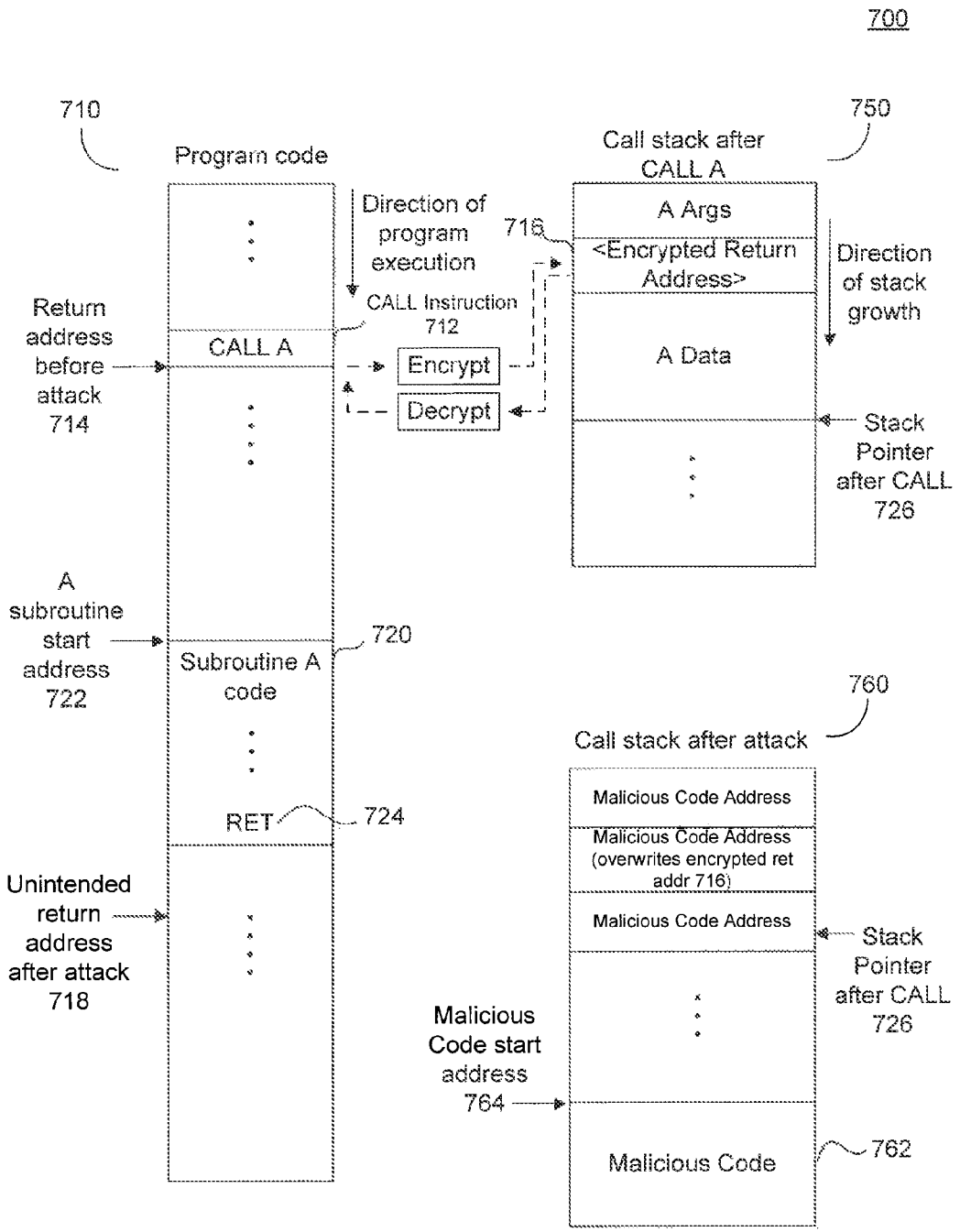
FIG. 7 is a diagram of memory contents of a computer system during an illustrative execution of a program code by a processor configured to perform return address encryption under a buffer overflow attack, according to an embodiment.

FIG. 7 depicts memory contents 700 of a computer system during an illustrative execution of a program code by processor 402 (FIG. 4) under a stack buffer overflow attack, in accordance with an embodiment. In this example, the memory contents include a region of memory 710 containing program code, a region of memory 750 illustrating the contents of the call stack before a buffer overflow attack and a region of memory 760 illustrating the contents of the call stack after a buffer overflow attack.

In one example, program code region 710 contains instructions that are to be executed by processor 402. In an embodiment, program code region 710 contains a subroutine A code 720, which is stored in subroutine start address 722. Program code region 710 contains call instruction 712, which calls subroutine A.

In one example, call stack region 750 stores a stack data structure created by processor 402 containing information regarding the subroutines of a computer program. As explained above with reference to FIG. 5, CPU 402 encrypts a return address 714 of subroutine A and stores encrypted return address 716 in stack 750. When routine A terminates by executing a return instruction 724, processor 402 decrypts return address 716 and redirects execution to return address 714.

In one example, call stack region 760 contains a stack data structure that has been overwritten by a stack overflow attack. Overwritten call stack region 760 contains a malicious code 762 and a malicious code start address 764.

In an embodiment, a stack overflow attack overwrites the encrypted return address 714 with malicious code start address 764. However, when subroutine A returns, CPU 402 (FIG. 4) will retrieve the malicious code start address 764 and decrypt it as described with reference to FIG. 6 above. As a result, CPU 402 will place the result of the decryption, which will be an unintended address in memory, into instruction pointer 410. This will cause CPU 402 to attempt to execute code from an unintended location 718 in memory, likely causing some kind of fault such as, for example, a general protection fault. Accordingly, unless an attacker knows the encryption algorithm and key used by CPU 402, the attacker will at most be able to cause a general error, but will not be able to redirect execution to malicious code 762.

Periodic Encryption Key Change

In an embodiment, an operating system running in computer environment 400 may want to further increase security by periodically changing the encryption key used by processes running in CPU 402 (FIG. 4). However, changing the encryption key for a process requires the operating system to change the encrypted return addresses for all subroutines in the process. Otherwise, changing the encryption key would cause all subroutines to return to incorrect memory addresses.

Figure 8:
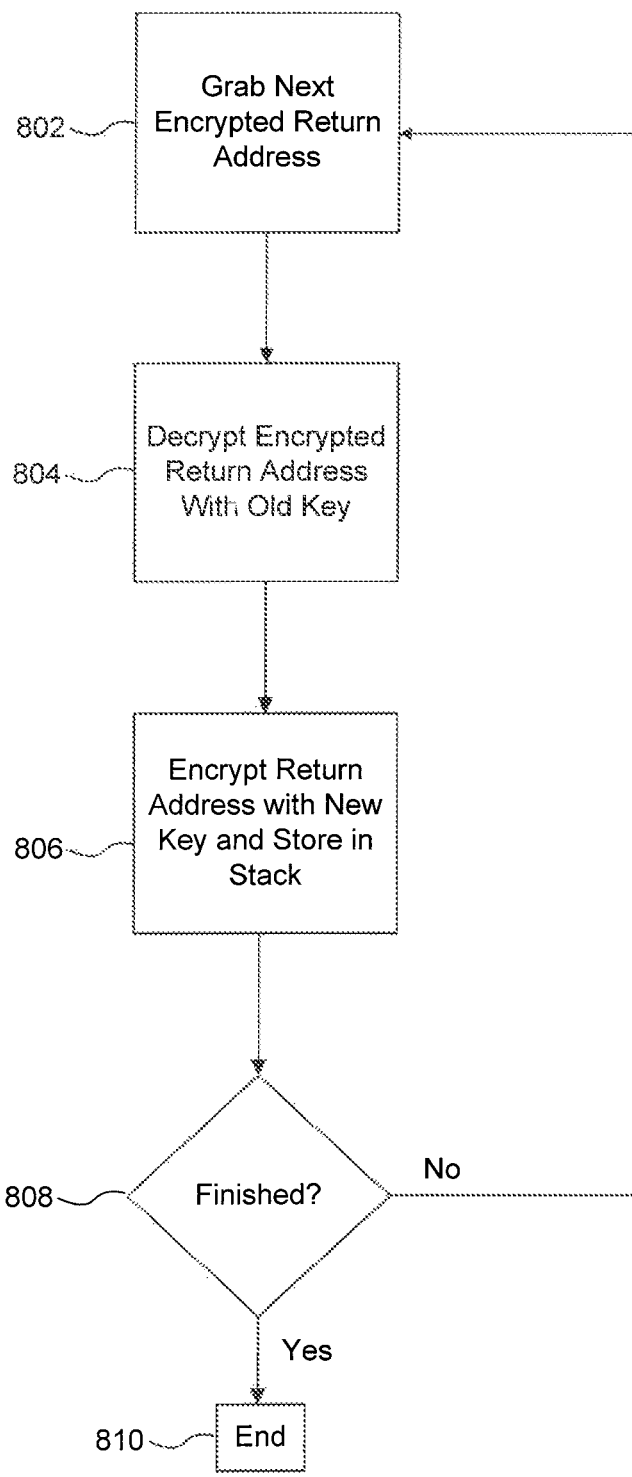
FIG. 8 is a flowchart depicting a process whereby an operating system changes the encryption key used by a processor, according to an embodiment.

FIG. 8 shows a flowchart depicting a method 800 in accordance with an embodiment. For example, an operating system can perform method 800 to change the encryption key used by a process, according to an embodiment. It is to be appreciated that not all operations need be performed, or be performed in the order shown. An exemplary embodiment is discussed below, in which method 800 is performed by the system shown in FIG. 4. This is a non-limiting example.

In one example, the operating system walks a call stack and changes all encrypted return addresses for every subroutine. Every encrypted return address is decrypted with an old key and encrypted with a new key.

At step 802, the operating system begins to walk the stack by reading an encrypted return address from the stack. The means of locating return addresses in a stack may depend on the specific operating system and the information the operating system maintains regarding subroutines in a process. In one embodiment, the operating system may determine the location of return addresses by using information regarding the size of each subroutine's stack frame, and using this information to calculate the address of the next return address pointer.

At step 804, the encrypted return address is decrypted with the old key.

At step 806, the address is encrypted with the new key and placed as corresponding subroutine's return address in the stack.

At step 808, the operating system determines whether there are subroutines with encrypted return addresses remaining to be re-encrypted. If at step 808 no subroutines are left to be examined in the stack, the process ends at step 810. Otherwise, the process returns to step 802 to grab the next encrypted return address from the stack.

The embodiment disclosed with reference to FIG. 8 is presented for illustrative purposes, and other embodiments will be envisioned by those skilled in the relevant arts and are intended to be encompassed herein.

An operating system may change the encryption key and re-encrypt the return addresses in numerous ways as will be understood by those skilled in the relevant arts. In an embodiment, operating system performs the re-encryption using traditional CPU instructions. In an embodiment, CPU 402 supports a re-encrypt instruction that decrypts a memory location with a given key and encrypts it with a new key.

Return Address Tracker Register

With reference to FIG. 4, in certain embodiments, a piece of code inside a subroutine might need to read the value of the return address of the subroutine. For example, certain software libraries (e.g., setjmp, thread libraries), which offer programmers the ability to modify the control flow of subroutine execution, will typically access the return address of the subroutine. However, such a piece of code running in computer system 400 may be unaware that CPU 402 performs return address encryption as described in the foregoing discussion. A code reading the return address from the stack in system 400 will retrieve an encrypted return address, but may treat it as if it was unencrypted and likely cause a program error.

Figure 9:
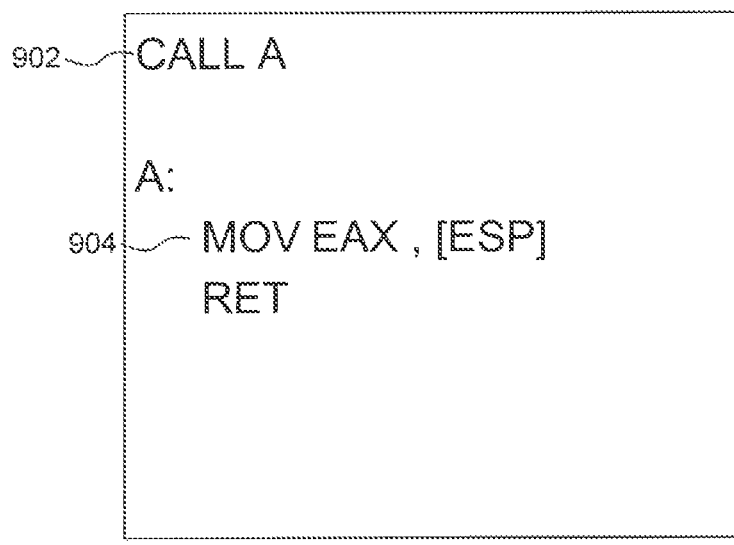
FIG. 9 is a portion of code that accesses a return address, according to an embodiment.

FIG. 9 depicts an example of a portion of code which would be incompatible with the operation of CPU 402 as thus far described. In one example, at step 902 code 900 calls a subroutine A and at step 904 reads the encrypted return address and places it into register EAX.

In an embodiment, the CPU may be configured to keep track of the return address pointer in a special register in order to address problems with software code that reads the return address of a subroutine. By keeping track of the return address pointer, the CPU can decrypt the return address before providing it to the software. This feature avoids the need to program software to take into account return address encryption, which would cause performance overhead and require recompilation of existing code.

Return address tracking is effective because of several properties adhered to by the vast majority of compiled software code, namely: 1) software only reads the current frame's return address, 2) software reads the entire return address pointer, and not just part of it, 3) software does not initiate execution operations as part of reading the return address pointer, and 4) software reads the return address pointer in leaf subroutines (a leaf subroutine is a subroutine that does not call any other subroutines). The return address tracking method described in this embodiment will catch reads of a return address pointer initiated by software that matches these criteria. Because these criteria hold true for the majority of software, the return address tracking mechanism herein described is an effective method of returning an unencrypted return address without the need to modify software.

Figure 10:
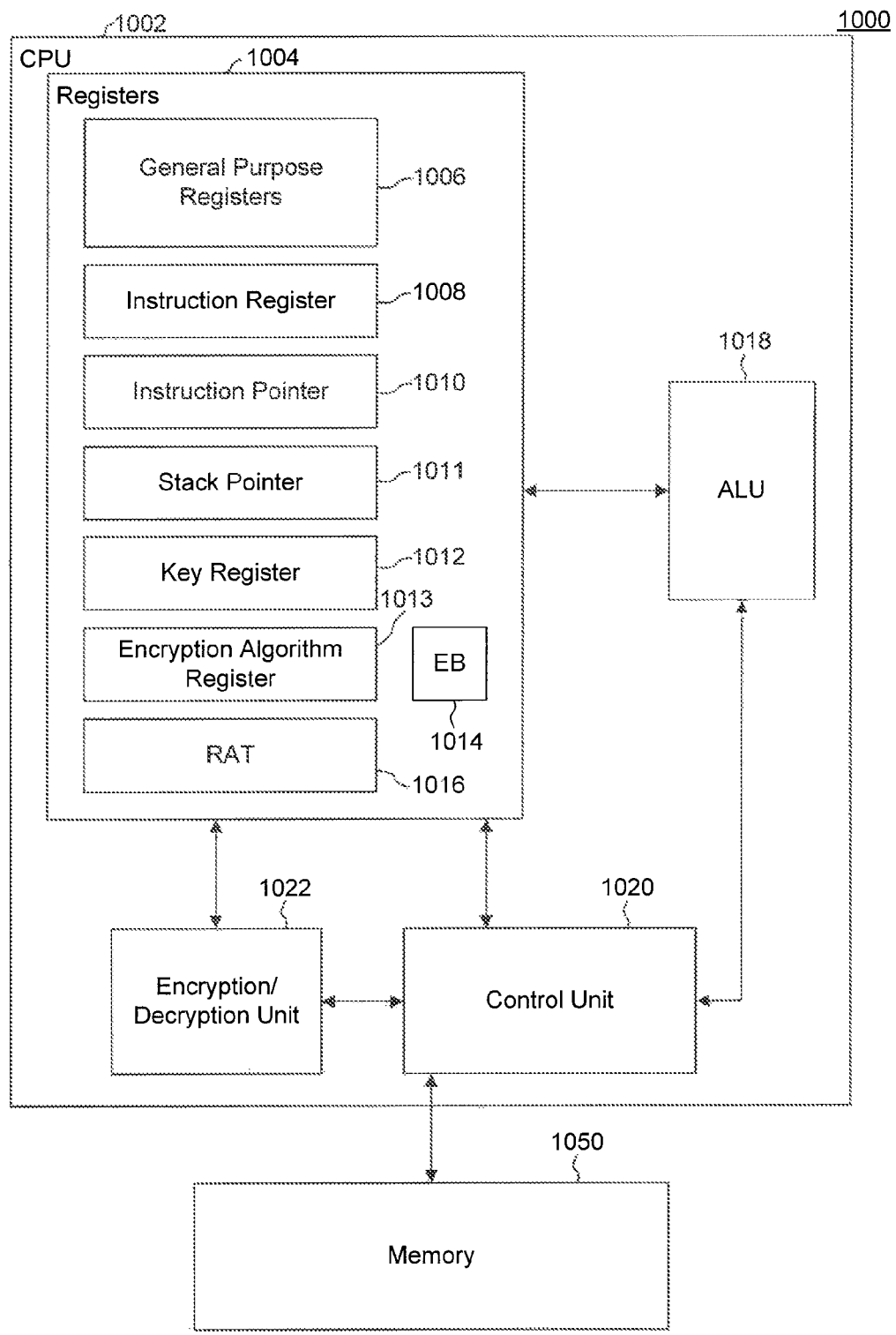
FIG. 10 is a system diagram of a computer processor operating environment configured to impede stack overflow attacks and track a return address, according to an embodiment.

FIG. 10 is a block diagram of an illustrative computer processor operating environment 1000 configured to impede stack overflow attacks, and further configured to track a return address, according to an embodiment. In the example shown, operating environment 1000 includes a central processing unit (CPU) 1002 and a memory unit 1050.

In an embodiment, CPU 1002 includes a set of registers 1004, an arithmetic logic unit (ALU) 1018, a control unit 1020 and encryption/decryption unit 1022. In an embodiment, the set of registers 1004 includes general purpose registers 1006, instruction register 1008, instruction pointer 1010, key register 1012, enable bit 1014 and return address tracker register (RAT) 1016.

In an embodiment, memory 1050 can be a cache memory contained within CPU 1002.

In one example, CPU 1002 keeps track of accesses to the return address on the stack and provides the correct unencrypted value in response. In one example, RAT 1016 stores the address of the stack location containing the return address of the subroutine, as will be further illustrated with reference to FIG. 11. By keeping track of the address in the stack where the return address is located, the CPU can detect attempts by software to read the encrypted return address and provide the unencrypted address instead, as will be further illustrated with reference to FIG. 12.

Figure 11:
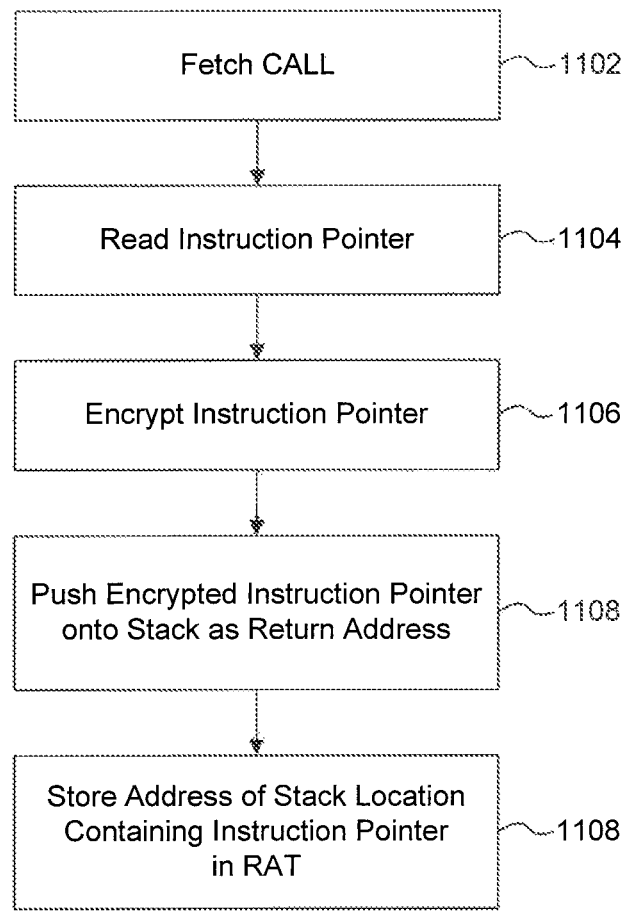
FIG. 11 is a flowchart depicting a process of maintaining the return address in a register in response to a call instruction, according to an embodiment.

FIG. 11 is a flowchart depicting a process 1100 according to an embodiment. For example process 1100 is maintaining the return address in the RAT 1016 in response to a call instruction. It is to be appreciated that not all operations need be performed, or be performed in the order shown.

At step 1102, a CPU fetches a call instruction.

At step 1104, the CPU reads the return address from instruction pointer 1010.

At step 1106, the CPU encrypts the return address.

At step 1108, the CPU pushes the encrypted address onto the call stack as the return address for the subroutine.

At step 1110, the CPU stores in the RAT the address of the location in the stack containing the return address.

Although presented as separate steps, the steps of flowchart 1100 can occur simultaneously or in a different order than illustrated here.

Figure 12:
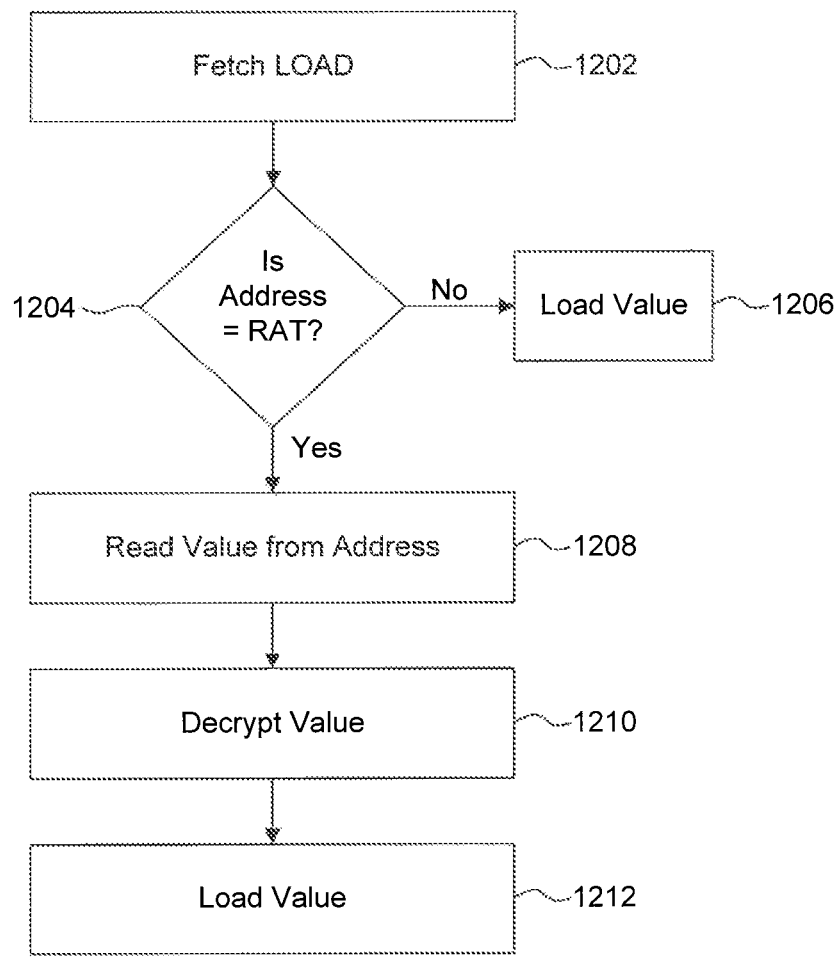
FIG. 12 is a flowchart depicting a process of reading the return address of a subroutine executing in a processor, according to an embodiment.

FIG. 12 is a flowchart illustrating a process 1200 in accordance with an embodiment. In one example, process 1200 performs a load while permitting reading a return address of a subroutine executing in CPU 1002. It is to be appreciated that not all operations need be performed, or be performed in the order shown.

At step 1202, the CPU fetches a load instruction, instructing the CPU to load data from a memory address into a register.

At step 1204, the CPU compares the address of the load with the address stored in RAT 1016.

If the addresses do not match, the CPU moves to step 1206 and loads the value from the memory at the load address into the destination register of the load and the load instruction is completed at this point.

If at step 1206 the addresses match, it means that the instruction was trying to read the return address of the process, which is encrypted. The CPU then moves to step 1208 and reads the value from the address.

At step 1210, the CPU decrypts the value using the key in register 1012 and encryption/decryption unit 1022.

At step 1212, the CPU completes the load by loading the decrypted value into the destination register of the load, thereby providing the decrypted return address to the destination register of the load.

Although presented as separate steps, the steps of flowchart 1200 can occur simultaneously or in a different order than illustrated here.

Figure 13:
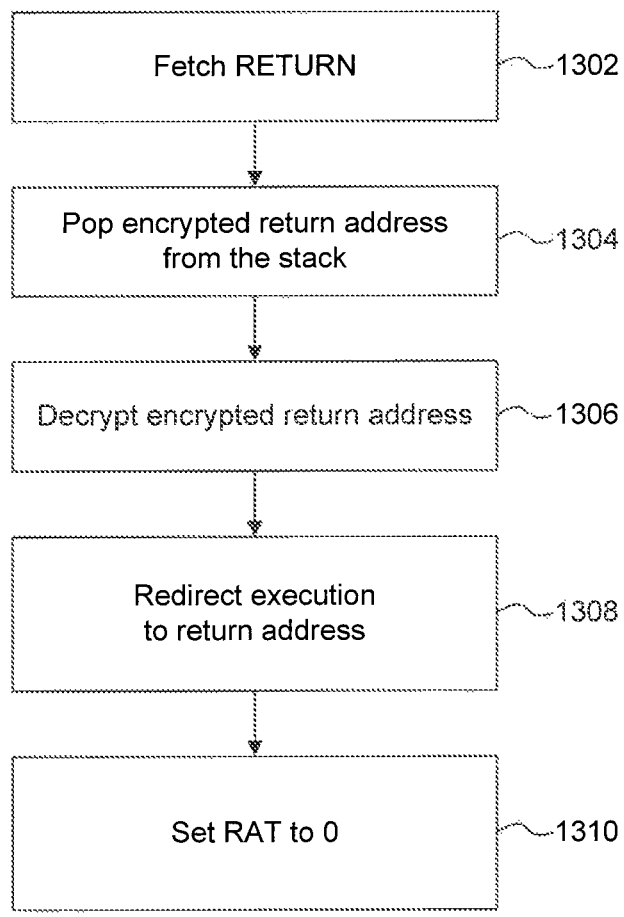
FIG. 13 is a flowchart depicting a process of resetting a return address tracking register in response to a return instruction, according to an embodiment.

FIG. 13 is a flowchart illustrating a process 1300 in accordance with an embodiment. For example, process 1300 is for resetting RAT 1016 in response to a return instruction. It is to be appreciated that not all operations need be performed, or be performed in the order shown.

At step 1302, a CPU fetches a return instruction, instructing the CPU to return from a subroutine.

At step 1304, the CPU pops the encrypted return address from the call stack.

At step 1306, the CPU decrypts the encrypted return address.

At step 1308, the CPU redirects execution to the return address.

At step 1310, the CPU sets RAT 1016 to 0. In an embodiment, 0 is an invalid memory address, which should not cause the CPU to match the load address with the address in RAT 1016. Clearing RAT 1016 to 0 after a subroutine prevents an inadvertent RAT match by a load executing outside of a subroutine.

Setting RAT 1016 to an invalid address after returning from a subroutine works because, as previously stated, most subroutines that access a return address pointer are leaf subroutines. Therefore, if a subroutine calls another subroutine, the calling subroutine would typically not attempt to access its return address pointer. However, there might be some instances of software in which this property does not hold true. In order to support software in those cases, in an embodiment, the CPU restores the value of RAT 1016 to the value it had prior to the current subroutine call instead setting RAT 1016 to an invalid address. If the calling subroutine attempts to load its return address pointer after the called subroutine returns, a RAT match will occur as described in step 1206 of FIG. 12, and the decrypted return address would be loaded.

In an embodiment, the CPU can keep track of the previous subroutine's address by calculating the difference between the current stack pointer and the current value of RAT 1016. The CPU can store this delta in the stack. In an embodiment, the memory address size of certain applications is larger than the memory word size. For example, in 64-bit applications running on an x86 architecture the upper 16 bits of the return address pointer in the stack are typically not used. Y In an embodiment, the delta between the current stack pointer and the current value of RAT 1016 is stored in the upper 16 bits of the return address pointer.

Figure 14:
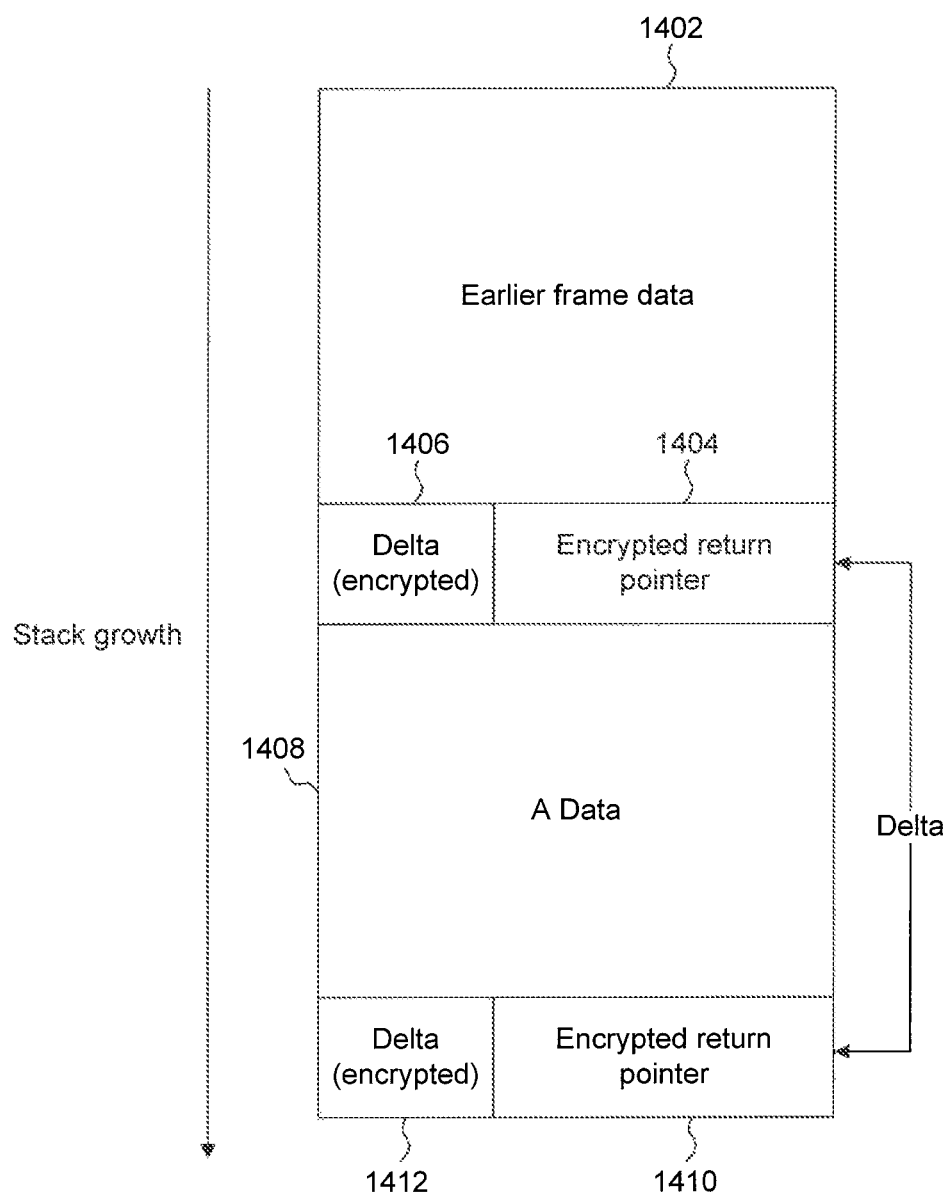
FIG. 14 is a diagram of the contents of exemplary a call stack storing a delta between return address pointers, according to an embodiment.

FIG. 14 shows the contents of exemplary call stack 1400, storing a delta between return address pointers, in an embodiment. Call stack 1400 includes frame data 1402, encrypted return pointer 1404 and delta 1406, associated with a first subroutine. Call stack 1400 further includes subroutine A data 1408, encrypted return pointer 1410, and delta 1412, associated with a second subroutine A.

When the CPU executes a call instruction, as described with reference to FIG. 11 above, at step 1108 the CPU can calculate the delta 1406 by calculating the difference between the stack pointer and the value in RAT 1016. With reference to FIG. 14, when the CPU calls subroutine A, it can place delta 1412 in the upper 16 bits of the encrypted return address 1410. In an embodiment, the CPU encrypts the delta before placing it in the stack.

When the CPU fetches a return instruction, as described with reference to FIG. 13 above, instead of resetting RAT 1016 to 0 at step 1310, the CPU can use the delta to compute the address of the previous return address pointer and restore this address to RAT 1016. In an embodiment, when returning from subroutine A at step 1310, the CPU subtracts delta 1412 from the current value of RAT 1016 and places the result in RAT 1016.

In an embodiment, methods 1100, 1200 and 1300 are performed by hardware logic circuitry, by microcode triggered in response to higher level machine code instructions, or by some combination of both as will be understood by those skilled in the relevant arts.

Out-of-Order Execution

Modern processors, in order to take advantage of parallel processing capabilities, may execute instructions out of order instead of sequentially. It would be advantageous for a processor to support return address encryption without adding any performance burden to out-of-order execution.

In an embodiment, a processor may try to execute load and store instructions out of order. However, executing a load early may result in loading data that has not yet been modified by a store instruction that occurs logically later in the program sequence. Conversely, executing a load late may result in loading data that has been modified by a store instruction that was executed out of order, but that was supposed to occur logically after the load in the program sequence. Therefore, a processor needs to keep track of the correct data values when performing out-of-order loads. Those skilled in the relevant arts will recognize numerous ways a processor can manage out-of-order instructions.

Figure 15:
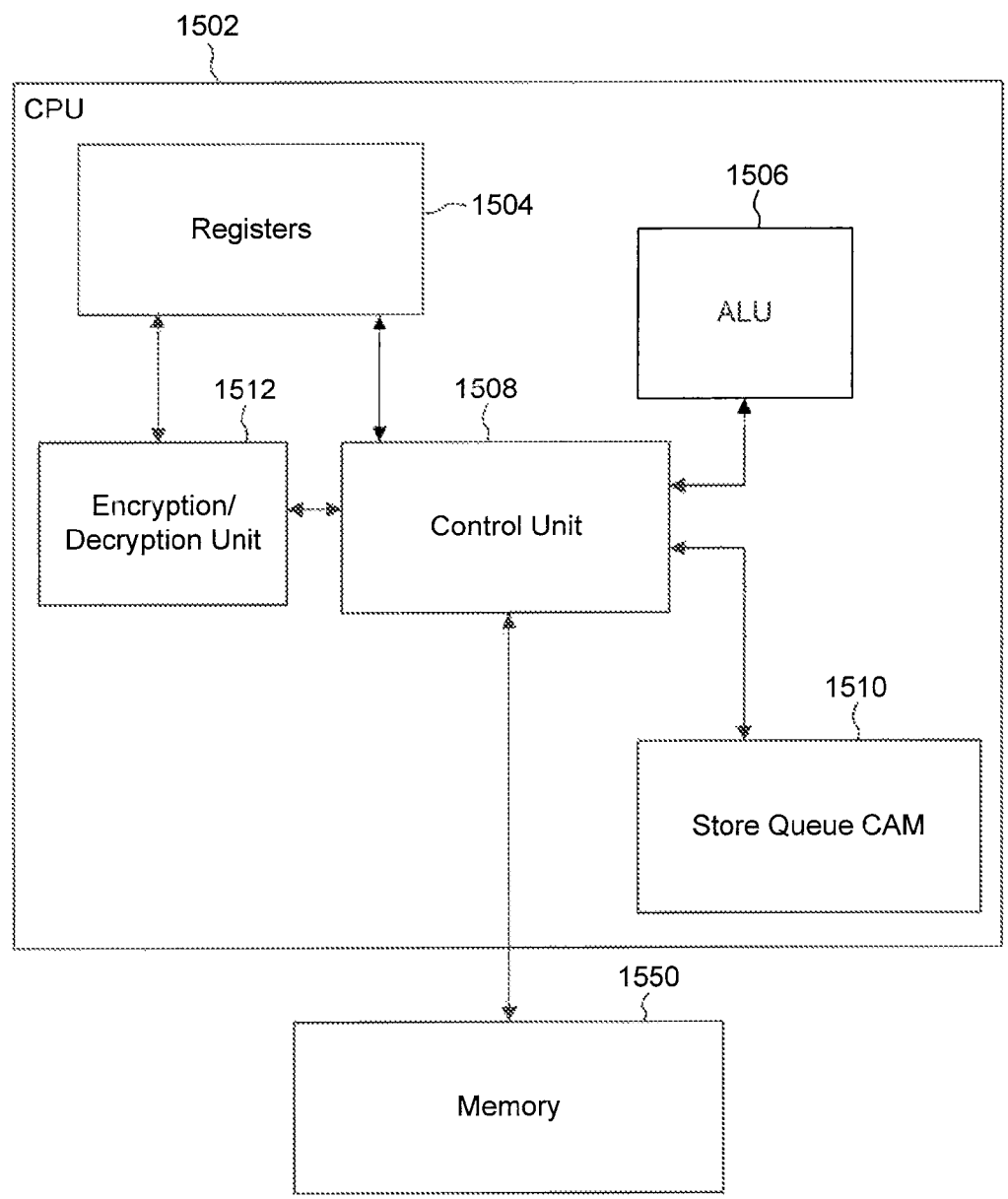
FIG. 15 is a system diagram of a computer processor operating environment configured to perform out-of-order load and stores, according to an embodiment.

FIG. 15 is a block diagram of an illustrative computer processor operating environment 1500 configured to perform out-of-order load and stores, according to an embodiment. In this example, operating environment 1500 includes a central processing unit (CPU) 1502 and a memory unit 1550.

In one example, CPU 1502 includes a set of registers 1504, an ALU 1506, a control unit 1508, a store queue content-addressable memory (CAM) 1510 and an encryption/decryption unit 1512.

In an embodiment, memory 1550 can be cache memory contained within CPU 1502.

In one example, store queue CAM 1510 serves as a temporary repository of store instructions that are executed out of order. A content-addressable memory is a special type of memory where the user provides a data word and the memory searches its entire contents to see if that data word is stored anywhere in it. In an embodiment, a processor stores the destination address and data of a store instruction in store queue CAM 1510 before committing the data to memory 1550. When the CPU fetches a load instruction, it searches store queue CAM 1510 for the address of the load. If the CPU finds a pending store whose address matches the address of the load, the CPU forwards the data value of the store to the destination register of the load. This process is known as "store-to-load forwarding." Once a store is committed to memory 1550, the CPU removes the store entry from store queue CAM 1510.

Figure 16:
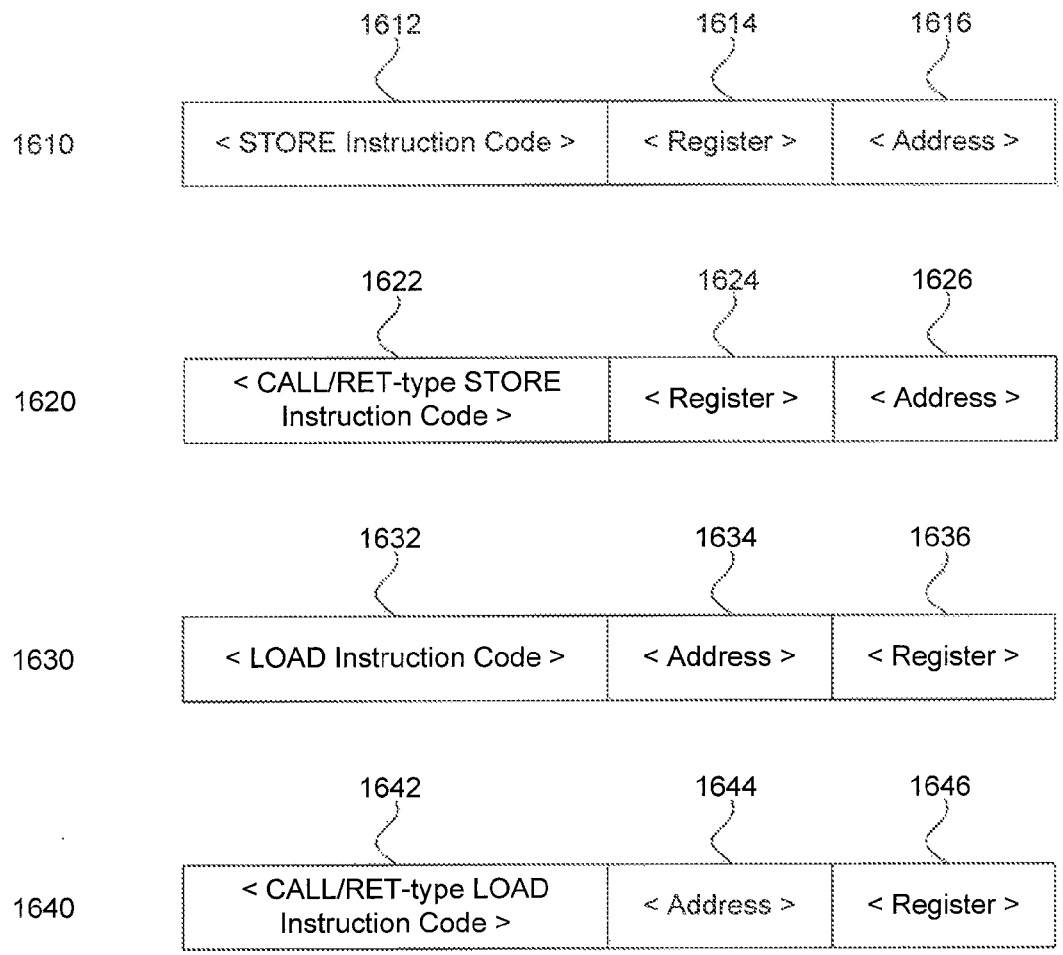
FIG. 16 is a diagram of the format for a store instruction and a load instruction supporting store-to-load forwarding and return address encryption, according to an embodiment.

FIG. 16 depicts instruction formats for store instructions and load instructions supporting store-to-load forwarding and return address encryption, according to an embodiment. The formats include a store instruction 1610, a call/return-type store instruction 1620, a load instruction 1630 and a call/return-type load instruction 1640.

In one example, store instruction 1610 includes a store instruction code 1612, a source register 1614, and a destination address 1616. Store instruction code 1612 indicates to the CPU that the instruction is a regular store instruction. Source register 1614 indicates the register that contains the data that is to be stored in memory. Destination address 1616 indicates the address in memory where the data is to be stored.

In one example, store instruction 1620 includes a call/return-type store instruction code 1622, a source register 1624 and a destination address 1626. When CPU 1502 fetches a call instruction, it executes a store instruction that stores a subroutine's stack data into a call stack. In an embodiment, such stores would be marked as a call/return type store by using call/return-type store instruction code 1622. Any other store instruction would be marked as a regular-type store and use store instruction code 1612.

In one example, load instruction 1630 includes a load instruction code 1632, a source address 1634, and a destination register 1636. Load instruction code 1632 indicates to the CPU that the instruction is a regular load instruction. Source address 1634 indicates the memory address that contains the data that is to be loaded into a register. Destination register 1636 indicates the register where the data is to be loaded.

In one example, load instruction 1640 includes a call/return-type load instruction, code 1642, a source address 1644 and a destination register 1646. When CPU 1502 fetches a return instruction, it executes a load instruction that loads a subroutine's return address into an instruction pointer. In an embodiment, such loads would be marked as a call/return-type load by using call/return-type load instruction code 1642. Any other load instruction would be marked as a regular-type store and use load instruction code 1632.

Figure 17:
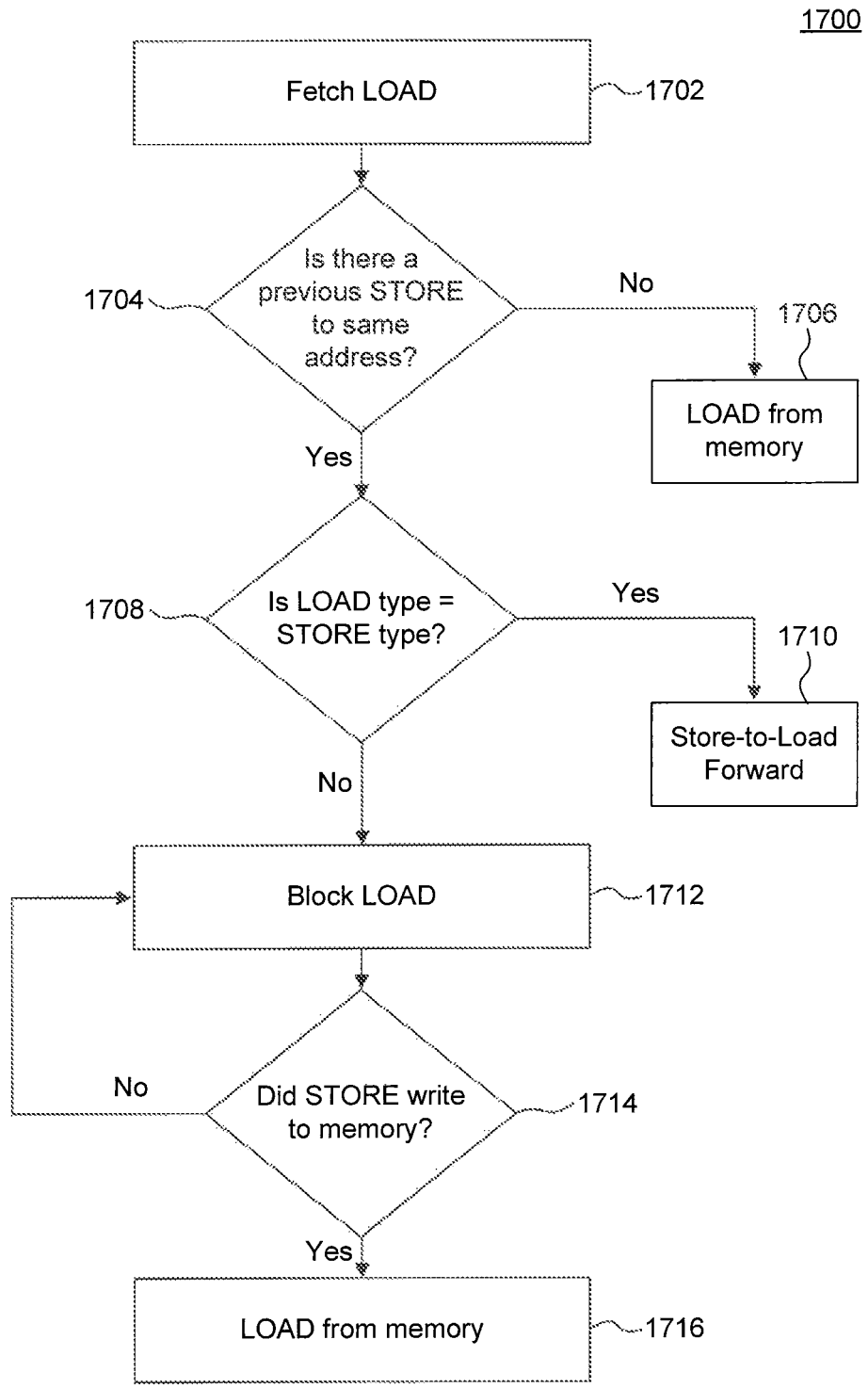
FIG. 17 is a flowchart depicting a process of completing a load instruction in a processor supporting store-to-load forwarding and return address encryption, according to an embodiment.

FIG. 17 shows a flowchart depicting a method 1700 in accordance with an embodiment. For example, method 1700 is a process of completing a load instruction in a processor supporting store-to-load forwarding and return address encryption, according to an embodiment. It is to be appreciated that not all operations need be performed, or be performed in the order shown. An exemplary embodiment is discussed below, in which method 1700 is performed by the system shown in FIG. 15. This is a non-limiting example.

At step 1702, a CPU fetches a load instruction.

At step 1704, CPU checks store queue CAM 1510 to verify if there is a logically prior store that matches the source address of the load. If store queue CAM 1510 does not contain a matching address, the CPU loads the value from memory 1550 using the same method explained with reference to memory 1050 in FIG. 12 above, checking if the address matches RAT 1016 and if so decrypting the value before writing it to the destination register. Otherwise, if at step 1704 the CPU finds a store with a matching address in store queue CAM 1510, the CPU compares the instruction code field to determine the type of the store and the load instructions at step 1708. If the types of the instructions match, the CPU performs a store-to-load forward of the data from store queue CAM 1510 to the destination register of the load, without accessing memory 1550.

If the types of the instructions do not match, the CPU blocks the load instruction until the matching store is committed to memory 1450, as illustrated in steps 1712 and 1714.

Once the store in store queue CAM 1510 is committed to memory 1550, the CPU loads the value from memory 1550 at step 1716 using the same method explained with reference to memory 1050 in FIG. 12 above, checking if the address matches RAT 1016 and if so decrypting the value before loading it. It should be noted that if the store corresponds to a call instruction, RAT 1016 will be updated at the time the store is committed to memory 1550, in accordance with the method illustrated in FIG. 11. Therefore, after the store commits the CPU can reliably check RAT 1016 and load the correct value. Although presented as separate steps, the steps of flowchart 1700 can occur simultaneously or in a different order than illustrated here.

In an embodiment, method 1700 is performed by hardware logic circuitry, by microcode triggered in response to higher level machine code instructions, or by some combination of both as will be understood by those skilled in the relevant arts.

Figure 18:
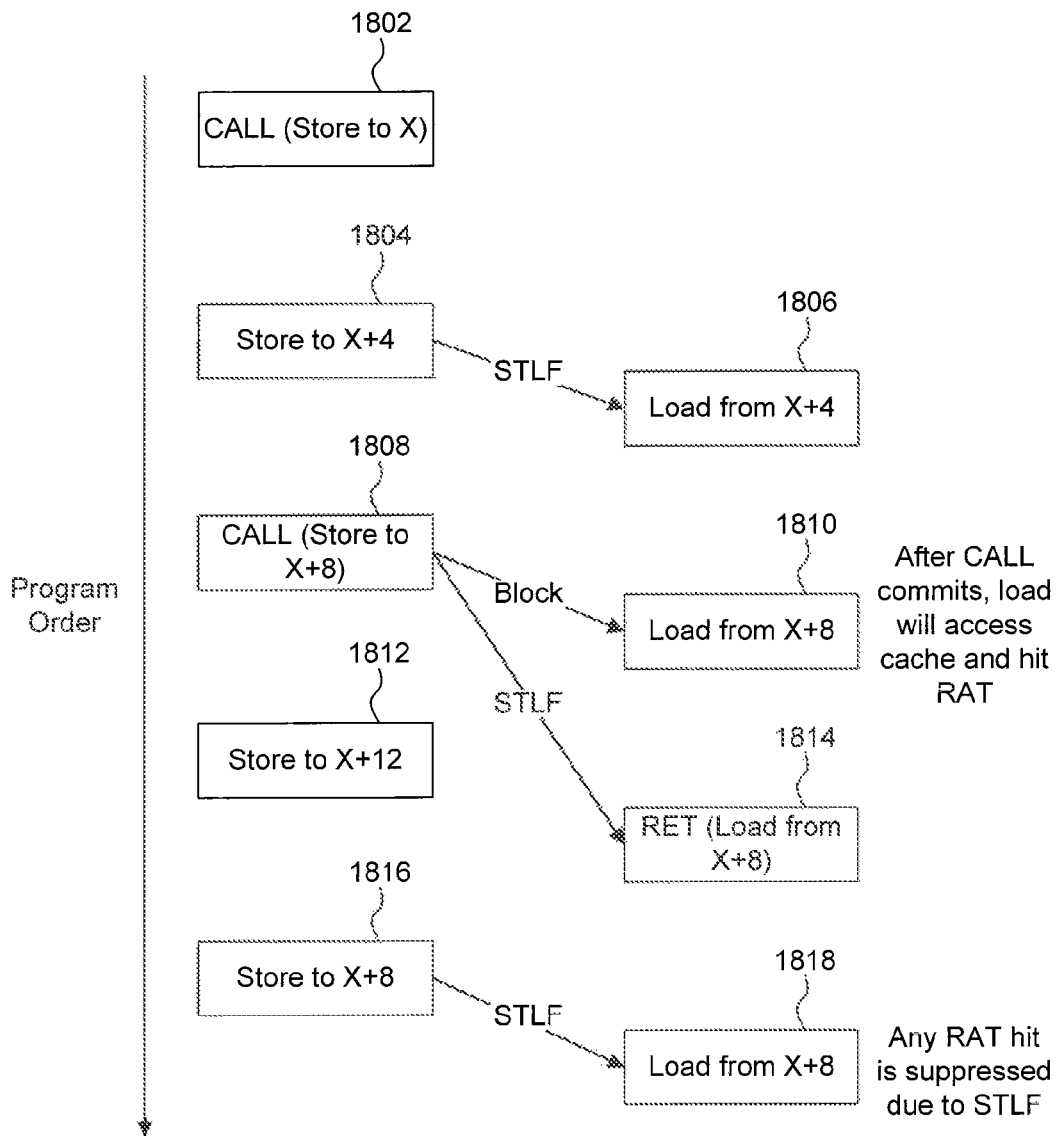
FIG. 18 depicts an exemplary program sequence illustrating the process of completing a load instruction in a processor supporting store-to-load forwarding and return address encryption, according to an embodiment.

FIG. 18 depicts an exemplary program sequence illustrating the operation of method 1700 in an embodiment. Although FIG. 18 depicts store instructions on the left and load instructions on the right for illustrative purposes, instructions are executed sequentially from top to bottom.

At program step 1802, a call instruction is executed, which in turn causes a call/return-type store (of the encrypted return address) to address X to be executed. This call/return-type store instruction can be placed in store queue 1510.

At program step 1804, a regular-type store to address X+4 is executed. This regular store instruction can be placed in store queue 1410.

At program step 1806, a regular-type load to address X+4 is executed. The CPU can check store queue 1510 and match the address X+4 of the load with the previous regular-type store to X+4. Since both are regular-type, the CPU can complete the load by forwarding the store value from store queue 1510 to the load register.

At program step 1808, a call instruction is executed, which in turn causes a call/return-type store (of the encrypted return address) to address X+8 to be executed. This call/return-type store instruction can be placed in store queue 1510.

At program step 1810, a regular-type load to address X+8 is executed. The CPU can check store queue 1410 and match the address X+8 of the load with the previous call/return-type store to X+8. However, since the store is a call/return-type store and the load is a regular-type store, the CPU can block the load until the call/return-type store to X+8 commits to memory 1550. In this way, the CPU avoids missing a potential RAT 1016 match and thus forwarding an encrypted return address to the load. Once the call/return-type store to X+8 commits to memory 1550, the load can complete by reading the address from memory 1550, which can cause a RAT 1016 match, as described with reference to FIG. 12 above. Therefore, the CPU can decrypt the return address before loading it, as described with reference to FIG. 12 above.

At program step 1812, a regular-type store to X+12 is executed. This regular store instruction can be placed in store queue 1510.

At program step 1814, a return instruction is executed, which in turn causes a call/return-type load (of the encrypted return address) of X+8 to be executed. The CPU can check store queue 1510 and match the address X+8 of the load with the previous call-type store to X+8. Since both instructions are of the same call/return type, the CPU can forward the encrypted return address directly from store queue 1510 to the return. Because the return instruction can decrypt the encrypted return address as described with reference to FIG. 13 above, there is no need to check RAT 1016 or decrypt the address before the load.

At program step 1816, a regular-type store to address X+8 is executed. This regular store instruction can be placed in store queue 1510.

At program step 1818, a regular-type load to address X+8 is executed. The CPU can check store queue 1510 and match the address X+8 of the load with the previous regular-type store to X+8. Since both are regular-type, the CPU can complete the load by forwarding the store value from store queue 1510 to the load register.

State Preservation Across Interrupts and Exceptions

In an embodiment, the processor may receive an interrupt or a processor generated exception. An interrupt is a signal or instruction to the processor that indicates an event which requires immediate attention. An exception is an anomalous or exceptional situation occurring during the execution of a program and which requires special handling such as, for example, a page fault. A processor receiving an interrupt or exception signal must save the state of the subroutine onto the stack and service the interrupt or exception by calling an interrupt or exception handler. Once the interrupt or exception is serviced, the CPU must then restore the state of the interrupted subroutine before continuing its execution.

Figure 19:
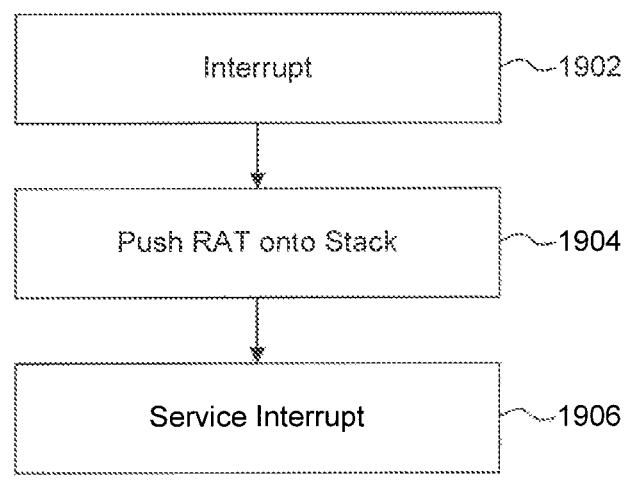
FIG. 19 is a flowchart depicting a process of preserving the state of a return address tracking register across an interrupt, according to an embodiment.

FIG. 19 shows a flowchart depicting a method 1900 in accordance with an embodiment. For example, method 1900 is process of preserving a state of a return address tracker register, e.g., RAT 1016 (FIG. 10) across an interrupt. It should be understood that the same concepts are equally applicable to an exception. It is to be appreciated that not all operations need be performed, or be performed in the order shown. An exemplary embodiment is discussed below, in which method 1900 is performed by the system shown in FIG. 15. This is a non-limiting example.

At step 1902 a CPU receives an interrupt signal.

At step 1904, the CPU pushes value in RAT 1016 onto the call stack.

At step 1906, the CPU services the interrupt by executing an interrupt handler subroutine.

Although presented as separate steps, the steps of flowchart 1900 can occur simultaneously or in a different order than illustrated here.

Figure 20:
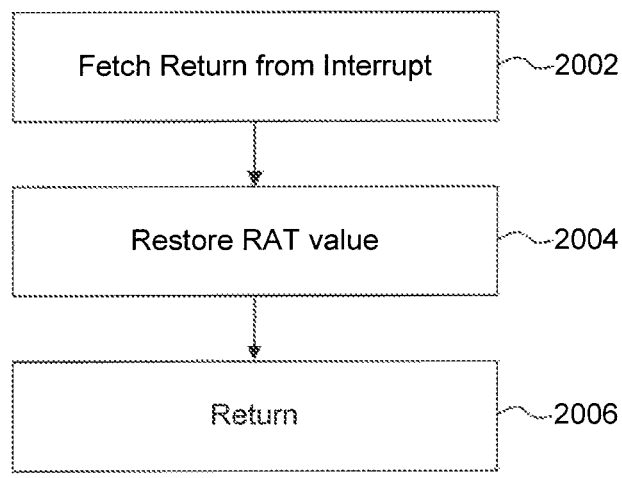
FIG. 20 is a flowchart depicting a process of restoring the state of a return address tracking register after an interrupt is serviced, according to an embodiment.

FIG. 20 shows a flowchart depicting a method 2000 in accordance with an embodiment. For example, method 2000 is a process of restoring a state of return address tracker register, e.g., RAT 1016, after an interrupt is serviced. It should be understood that the same concepts are equally applicable to an exception. It is to be appreciated that not all operations need be performed, or be performed in the order shown. An exemplary embodiment is discussed below, in which method 2000 is performed by the system shown in FIG. 15. This is a non-limiting example.

At step 2002, a CPU fetches a return from interrupt instruction.

At step 2004, the CPU pops the value of a RAT from the call stack and loads the value into RAT 1016.

At step 2006, the CPU returns from the interrupt and resumes execution of the interrupted program code.

Although presented as separate steps, the steps of flowchart 2000 can occur simultaneously or in a different order than illustrated here.

In an embodiment, methods 1900 and 2000 are performed by hardware logic circuitry, by microcode triggered in response to higher level machine code instructions, or by some combination of both as will be understood by those skilled in the relevant arts. In an embodiment, the value of RAT 1016 is made accessible to an operating system. When servicing an interrupt or exception, the operating system may save the state of the value of RAT 1016 and restore it across the interrupt or exception.

Embodiments can be accomplished, for example, through the use of general-programming languages (such as C or C++), hardware-description languages (HDL) including Verilog HDL, VHDL, Altera HDL (AHDL) and so on, other available programming and/or schematic-capture tools (such as circuit-capture tools), or hardware level instructions implementing higher-level machine code instructions (e.g., microcode). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

In this document, the terms "computer program medium" and "computer-usable medium" are used to generally refer to media such as a removable storage unit or a hard disk drive. Computer program medium and computer-usable medium can also refer to memories, such as system memory and graphics memory which can be memory semiconductors (e.g., DRAMs, etc.). These computer program products are means for providing software to a computer system.

The embodiments are also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments described herein. Embodiments employ any computer-usable or -readable medium, and any computer-usable or -readable storage medium known now or in the future. Examples of computer-usable or computer-readable mediums include, but are not limited to, primary storage devices (e.g., any type of random access memory or read-only memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A processor comprising:
    hardware logic configured to:
        receive a machine code call instruction configured to cause the processor to call a subroutine by storing a start address of the subroutine into an instruction pointer and a return address onto a call stack;
        in response to receiving the machine code call instruction:
            encrypt a return address of the subroutine, the return address being the value of the instruction pointer prior to storing the start address, and
            store the encrypted return address in the call stack;
        retrieve the encrypted return address from the call stack;
        decrypt the encrypted return address; and
        redirect execution to the return address.

2. The processor of claim 1, wherein the logic uses a key stored in a register to perform the encryption and decryption.

3. The processor of claim 2, wherein the register is accessible to privileged code.

4. The processor of claim 2, wherein the key comprises at least part of a stack pointer.

5. The processor of claim 1, wherein the logic is configured to use one of a plurality of encryption algorithms.

6. The processor of claim 1, wherein the logic is configured to permit disabling of the encryption and decryption.

7. A processor comprising:
    hardware logic configured to:
        receive a machine code call instruction configure to cause the processor to call a subroutine by storing a start address of the subroutine into an instruction pointer and a return address onto a call stack;
        in response to receiving the machine code call instruction:
            encrypt a return address of the subroutine, the return address being the value of the instruction pointer prior to storing the start address, and
            store the encrypted return address in the call stack, and
        in response to a machine code re-encrypt instruction:
            load the encrypted return address from the call stack,
            decrypt the encrypted return address with a first key,
            re-encrypt the return address with a second key, and
            store the re-encrypted return address in the call stack.

8. A method comprising:
    receiving, using circuitry within a processor, a machine code call instruction that causes the processor to call a subroutine by storing a start address of the subroutine into an instruction pointer and a return address onto a call stack;
    encrypting, using the circuitry in response to the machine code call instruction, a return address of the subroutine, the return address being the value of the instruction pointer prior to storing the start address;
    storing, using the circuitry, the encrypted return address in the stack;
    retrieving the encrypted return address from the call stack;
    decrypting the encrypted return address; and
    redirecting execution to the return address.

9. The method of claim 8, wherein the method further comprises using a key stored in a register to perform the encryption and decryption.

10. The method of claim 9, wherein the register is accessible to privileged code.

11. The method of claim 9, wherein the method further comprises using at least part of a stack pointer as the key.

12. The method of claim 8, wherein the method further comprises using one of a plurality of encryption algorithms.

13. The method of claim 8, wherein the method further comprises disabling the encryption and decryption.

14. A method comprising:
    receiving, using circuitry within a processor, a machine code call instruction that causes the processor to call a subroutine by storing a start address of the subroutine into an instruction pointer and a return address onto a call stack;
    encrypting, using the circuitry, in response to the machine code call instruction, a return address of the subroutine, the return address being the value of the instruction pointer prior to storing the start address;
    storing, using the circuitry, the encrypted return address in the call stack;
    reading, using the circuitry, in response to a machine code re-encrypt instruction, the encrypted return address from the call stack;
    decrypting, using the circuitry, the encrypted return address with a first key;
    re-encrypting, using the circuitry, the return address with a second key; and
    storing, using the circuitry, the re-encrypted return address in the call stack.

15. A computer-readable storage device having instructions stored thereon, execution of which by a processor cause the processor to perform operations, the operations comprising:
    receiving a machine code call instruction that causes the processor to call a subroutine by storing a start address of the subroutine into an instruction pointer and a return address onto a call stack;

encrypting in response to the machine code call instruction, a return address of the subroutine, the return address being the value of the instruction pointer prior to storing the start address;

storing the encrypted return address in the stack;

retrieving the encrypted return address from the call stack;

decrypting the encrypted return address; and redirecting execution to the return address.

16. The computer-readable storage device of claim 15, further comprising using a key stored in a register to perform the encryption and decryption.

17. The computer-readable storage device of claim 16, wherein the register is accessible to privileged code.

18. The computer-readable storage device of claim 15, further comprising using at least part of a stack pointer as the key.

19. The computer-readable storage device of claim 15, further comprising using one of a plurality of encryption algorithms.

20. The computer-readable storage device of claim 15, further comprising disabling the encryption and decryption.

21. A computer-readable storage device having instructions stored thereon, execution of which by a processor cause the processor to perform operations comprising:

receiving a machine code call instruction that causes the processor to call a subroutine by storing a start address of the subroutine into an instruction pointer and a return address onto a call stack;

encrypting, in response to the machine code call instruction, a return address of the subroutine, the return address being the value of the instruction pointer prior to storing the start address;

store the encrypted return address in the call stack;

reading, in response to a machine code re-encrypt instruction, the encrypted return address from the call stack;

decrypting the encrypted return address with a first key;

re-encrypting the return address with a second key; and storing the re-encrypted return address in the call stack.

* * * * *